No. 675,450. Patented June 4, 1901.
W. H. STEVENS.
FEED TUBE FOR GRAIN DRILLS.
(Application filed Mar. 21, 1901.)
(No Model.)
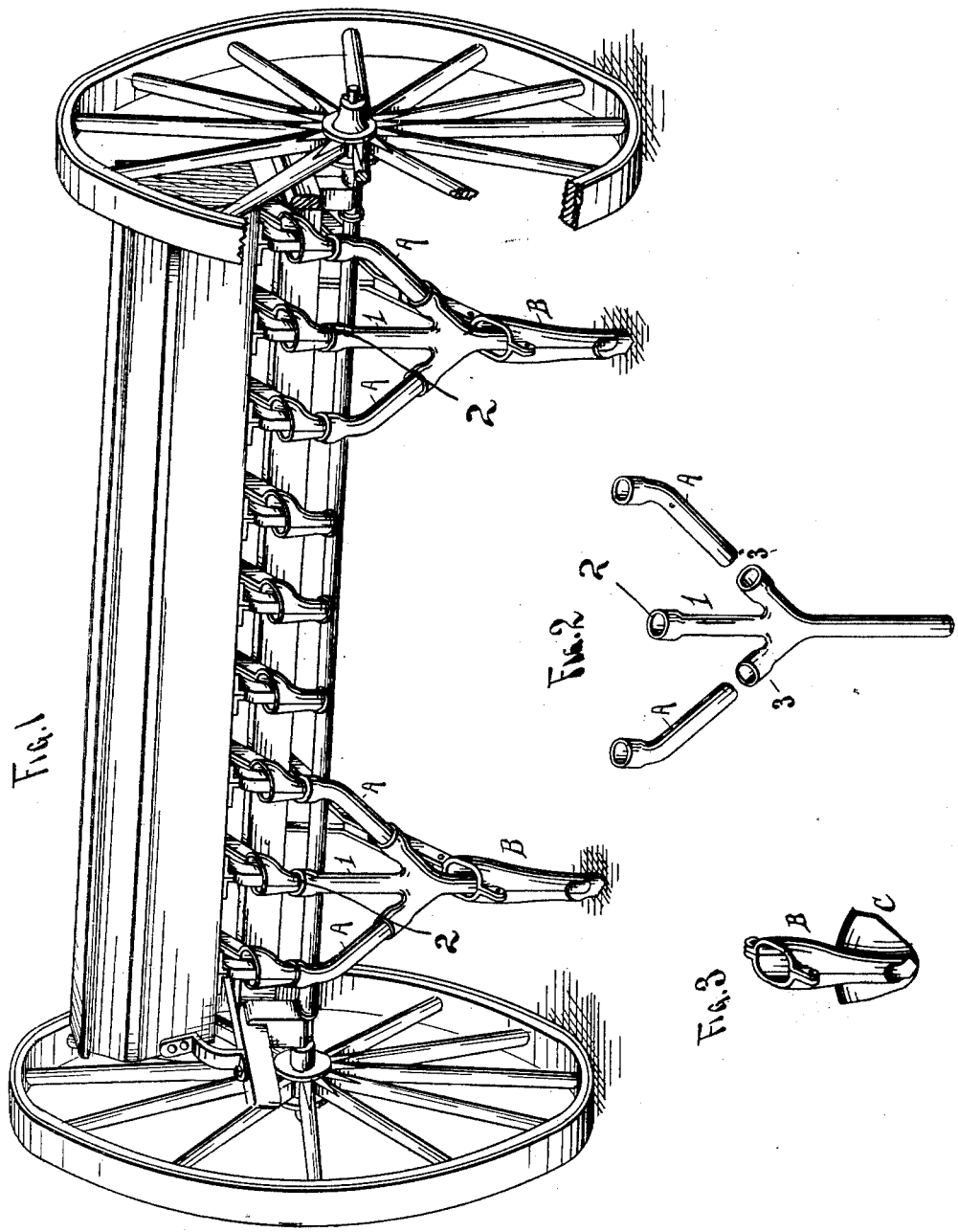
Witnesses
C. H. Woodward.
J. W. Garner
WILLIAM H. STEVENS, Inventor
By C. A. Snow & Co.
Attorneys

UNITED STATES PATENT OFFICE.

WILLIAM H. STEVENS, OF LITTLE VALLEY, NEW YORK.

FEED-TUBE FOR GRAIN-DRILLS.

SPECIFICATION forming part of Letters Patent No. 675,450, dated June 4, 1901.

Application filed March 21, 1901. Serial No. 52,228. (No model.)

*To all whom it may concern:*

Be it known that I, WILLIAM H. STEVENS, a citizen of the United States, residing at Little Valley, in the county of Cattaraugus and State of New York, have invented a new and useful Feed-Tube for Grain-Drills, of which the following is a specification.

My invention is an improved feed-tube for grain-drills for conveying the fertilizer discharged from a plurality of feed-cups to a single drill, thereby concentrating the fertilizer therein, and adapted particularly for fertilizing drills as the same are opened for corn, potatoes, and other crops; and it consists in the peculiar construction and combination of devices hereinafter fully set forth and claimed.

In the accompanying drawings, Figure 1 is a rear perspective view of a grain-drill of usual construction provided with feed-tubes embodying my improvements. Fig. 2 is a detail perspective view of one of my improved feed-tubes. Fig. 3 is a detail perspective view of a drill-shoe provided with a shovel or plow for opening drills for corn, potatoes, and other crops.

My improved feed-tube 1 is preferably made of rubber or other suitable flexible material, has a central intake 2 at its upper end, which is adapted to be attached to one of the feed-cups of a grain-drill in the usual manner, and is provided at a lower point on opposite sides with intakes 3, in which the lower ends of flexible feed-tubes A, of usual construction, which lead from proximate feed-cups, are adapted to be inserted, whereby the said feed-tubes A may be coupled to my improved feed-tube, so that the material discharged from a plurality of the feed-cups may be conveyed through a single shoe B, of usual construction, in which the lower end of my improved feed-tube 1 is placed, into a single drill opened by the said shoe, so that fertilizer discharged from a plurality of the feed-cups of the machine may be concentrated in a single drill. Any desired number of my improved feed-tubes may be used on the machine. In Fig. 1 of the drawings I have shown the machine provided with two of my improved feed-tubes and with a corresponding number of shoes for opening the drills at a suitable distance apart for planting corn.

When it is desired to open drills for potatoes and fertilize the same, I provide the shoes B, which are operated in connection with my improved feed-tubes, with suitable plows or plates C, as shown in Fig. 3. It will be understood that potatoes are not dropped by the machine into the drills nor covered thereby, this usually being done by hoes and the potatoes being usually dropped by hand. While I have shown my improved feed-tube as provided with two lateral intakes 3, it will be understood that my improved feed-tube may be provided with any desired number of such intakes.

Having thus described my invention, I claim—

1. A feed-tube for grain-drills having a central intake adapted to be attached to a feed-cup, and lateral intakes adapted to be coupled to other feed-tubes, whereby material discharged from a plurality of feed-cups may be conducted to a single drill, substantially as described.

2. A flexible feed-tube for grain-drills having a central intake at its upper end adapted to be coupled to a grain-drill feed-cup, and lateral intakes at a lower point adapted to be coupled to other feed-tubes, for the purpose set forth, substantially as described.

In testimony that I claim the foregoing as my own I have hereto affixed my signature in the presence of two witnesses.

WILLIAM H. STEVENS.

Witnesses:
HARLOW J. CRISSEY,
HENRY B. HILTLE.